United States Patent
Simmons, Jr.

[11] Patent Number: 6,127,055
[45] Date of Patent: Oct. 3, 2000

[54] MULTI-SOURCE ELECTRICAL DRIVE SYSTEM

[76] Inventor: Timothy C. Simmons, Jr., 366 Bradley St., Apt. 32B, Flint, Mich. 48503

[21] Appl. No.: 08/974,024

[22] Filed: Nov. 19, 1997

[51] Int. Cl.[7] .............................. H01M 8/02; H01M 8/04
[52] U.S. Cl. ................................. 429/12; 429/34; 429/41
[58] Field of Search .................................. 429/12, 34, 41, 429/42, 43

[56] References Cited

U.S. PATENT DOCUMENTS

| | | |
|---|---|---|
| 4,246,080 | 1/1981 | Shinn . |
| 4,442,801 | 4/1984 | Glynn et al. . |
| 4,528,947 | 7/1985 | Olivera . |
| 4,763,610 | 8/1988 | Thomas . |
| 4,983,472 | 1/1991 | Katz et al. . |
| 5,143,025 | 9/1992 | Munday . |
| 5,435,274 | 7/1995 | Richardson, Jr. . |
| 5,458,095 | 10/1995 | Post et al. . |
| 5,503,945 | 4/1996 | Petri et al. . |
| 5,513,600 | 5/1996 | Teves . |
| 5,543,241 | 8/1996 | Noshioka et al. . |
| 5,789,093 | 8/1998 | Malhi .......................................... 429/34 |

FOREIGN PATENT DOCUMENTS

| | | |
|---|---|---|
| 736486 | 6/1943 | Germany . |
| 4115727 | 1/1992 | Germany . |
| 1636-574 | 3/1991 | U.S.S.R. . |

Primary Examiner—Maria Nuzzolillo
Assistant Examiner—Mark Ruthkosky
Attorney, Agent, or Firm—Ramon L. Pizarro; Edwin H. Crabtree

[57] ABSTRACT

A multi-source electrical drive system which includes an electrolysis cell for separating water into hydrogen and oxygen. The system further includes an oxygen storage device and a hydrogen storage device. The hydrogen, the oxygen storage device and the electrolysis cell are maintained at substantially the same elevated pressure. The system further includes a fuel cell system that includes a membrane electrode assembly, a base plate that includes a surface that is contactable with an electrode. The base plate includes a plurality of ribs that protrude from the surface that is contactable with an electrode. A bipolar plate with a surface that is contactable with an electrode and a plurality of ribs that project from the first surface and are spaced apart in a manner that allows the ribs on the first surface of the bipolar plate to nest between the ribs on the surface of the base plate is used, so that the ribs on the first surface of the bipolar plate rest between the ribs on the base plate in a spaced apart relationship to the ribs of the base plate, so that the membrane electrode assembly may be held between the base plate and the bipolar plate to define a first reactant chamber and a second reactant chamber between the base plate and the bipolar plate, the first reactant chamber being in fluid communication with the oxygen storage device, and the second reactant chamber being in fluid communication with the hydrogen storage device.

8 Claims, 5 Drawing Sheets

6,127,055

MULTI-SOURCE ELECTRICAL DRIVE SYSTEM

BACKGROUND OF THE INVENTION (a) Field of the Invention

This invention generally relates to a system which uses electrical energy from a variety of sources to produce a system that converts the electrical energy to mechanical energy. More specifically, but not by way of limitation, to a system that uses a novel fuel cell assembly, together with an electrolysis cell to produce electricity for driving a means for converting the electrical power into mechanical activity.

(b) Discussion of Known Art

The generation of electrical energy through devices such as solar cells, fuel cells, chemical batteries, and turbine driven generators has long been known. However, the combination of these means for generating electrical power to achieve a system that combines different stages that combine these methods of converting energy to electrical energy to take advantage of the by-products of each stage to provide a synergistic system for ultimately producing mechanical power or storing energy as chemical potential. Examples of systems that incorporate several different known means for converting energy from different sources to mechanical energy include U.S. Pat. No. 5,435,274 to Richardson, Jr., which teaches the combination of an underwater carbon arc to separate hydrogen and oxygen molecules from water. The resulting hydrogen is used in combination with air and other gases as a combustible mixture to produce mechanical work.

Another known system is taught by Shinn in U.S. Pat. No. 4,246,080. The Shinn invention includes a reflector that is used to concentrate solar energy. This solar energy is focused on thermocouples to create electrical energy which is used to separate hydrogen and oxygen molecules from water. The hydrogen and oxygen may then be stored to be reacted to generate electrical energy through a turbine or the like.

Several other systems combine the use of an electrolytic cell to separate water into hydrogen and oxygen. The hydrogen and oxygen is then mixed with other fuels to be burned within an internal combustion engine or the like. Known devices of this sort may be found in U.S. Pat. Nos. 5,513,600 to Teves, 4,524,947 to Olivera, and 4,442,801 to Glynn et al. These devices provide a means for using solar power or other sources of electrical energy to enhance the performance of combustion engines. However, these devices have prevent difficult to incorporate int practice due to the large potential energy losses introduce by inefficiencies in the various stages of the systems.

An important advancement in the use of hydrogen and oxygen to produce electrical energy is the fuel cell. The basic method of operation of the fuel cell has been well understood for many years. However, fuel cells have not received wide commercial acceptance due to the need to incorporate large, complicated components to achieve a production rate of electricity as may be needed to move a small vehicle, for example. A significant problem with the fuel cell has been the bulk and weight of the stacks of fuel cells needed to develop voltages and currents for practical applications.

The design of a fuel cell includes a compartment for accepting a fuel, a first electrode, an electrolyte, a second electrode, and a compartment for accepting an oxidant. The electrodes should be separated by the electrolyte, and the fuel and oxidant be allowed to react through the electrolyte. The reaction results in a release of electrons, which are collected in the electrodes where they are made available for providing an electric current.

Designs for fuel cells depend greatly on the type of electrolyte used between the electrodes. The electrolyte used is typically categorized by its physical characteristics. One commonly used type of electrolyte is the static electrolyte system, in which the electrolyte is simply an ionically conducting layer that separates the two electrodes. Other known types of electrolyte systems are the fluid or circulating electrolyte systems, which typically use a circulating acid to provide precise control of the electrolyte volume in each cell of a stack of cells and for the cooling of the stack as necessary. Fluid electrolyte systems include alkaline electrolyte systems, molten carbonate electrolyte systems, and phosphoric acid electrolyte systems. Solid electrolyte systems include solid oxides within polymer systems. Each type of electrolyte system has its own advantages as well disadvantages and problems.

Thus, a review of known devices reveals that there remains a need for a system that takes advantage of the high efficiency of fuel cells. More specifically, a need exists for a system that uses few moving parts, takes advantage of the efficiencies of the fuel cell, and does not incorporate the disadvantages of systems that use internal combustion.

SUMMARY

It has been discovered that the problems left unanswered by known art can be solved by providing a system that includes the following elements:

a) an electrolysis cell which operates at an elevated pressure;

b) means for storing hydrogen and oxygen produced by the electrolysis cell;

c) a fuel cell having a static electrolyte;

d) means for capturing and recycling the physical products of the fuel cell reaction;

e) means for storing and using the electrical energy generated through the fuel cell.

In a highly preferred embodiment of the invention the fuel cell is designed from components that facilitate the formation and stacking of individual cells to achieve the desired power generation needs of the application. More specifically, the fuel cell includes the following elements:

a) a base plate that includes a surface that is contactable with an electrode; and b) a bipolar plate.

The base plate includes a plurality of ribs that protrude from the surface that is contactable with an electrode. The bipolar plate includes a first surface that is contactable with an electrode and a plurality of ribs that project from the first surface and are spaced apart in a manner that allows the ribs on the first surface of the bipolar plate to nest between the ribs on the surface of the base plate, so that the ribs on the first surface of the bipolar plate rest between the ribs on the base plate in a spaced apart relationship to the ribs of the base plate. The spacing of the ribs allows the placement and retention of solid polymer electrolyte sheets between the ribs of a pair of plates and allow the formation of sections of a divider wall of electrolyte material. The divider wall being at an angle, preferably at a forty five degree angle, to the ribs, so that the surface area of the electrolyte material is maximized, and so that the angle of the electrolyte divider allows the collection and retention of water produced by the fuel cell.

Additionally, a raised perimeter which encloses manifolding passages will preferably be formed between the base plate and the bipolar plate, so as to produce a sealed area between the base plate and the bipolar plate.

In a highly preferred embodiment the bipolar plate also includes a second surface which includes a plurality of ribs that are arranged in a substantially similar arrangement to the ribs on the base plate, so that a second bipolar plate may be mounted over the bipolar plate that has been mounted over the base plate. Thus the ribs on the first surface of the second bipolar plate will nest between the ribs of the second surface of the bipolar plate that has been mounted over the base plate in substantially the same manner as the ribs on the first surface of the bipolar plate nest between the ribs of the base plate.

Thus it will be understood that with the above described plate arrangement a series of bipolar plates may be stacked over one another to achieve the desired stack of fuel cells. Each fuel cell will take advantage of a plate used to form the preceding fuel cell. Clearly, it is contemplated that a fuel cell stackup may be formed from bipolar plates alone. However, it is convenient to terminate the fuel cell stackup with end plates that seal off or terminate the stackup geometry. Thus the disclosed design for the fuel cell formation achieves new, synergistic, results that are not achieved with known configurations.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it is understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which.

DETAILED DESCRIPTION OF PREFERRED EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
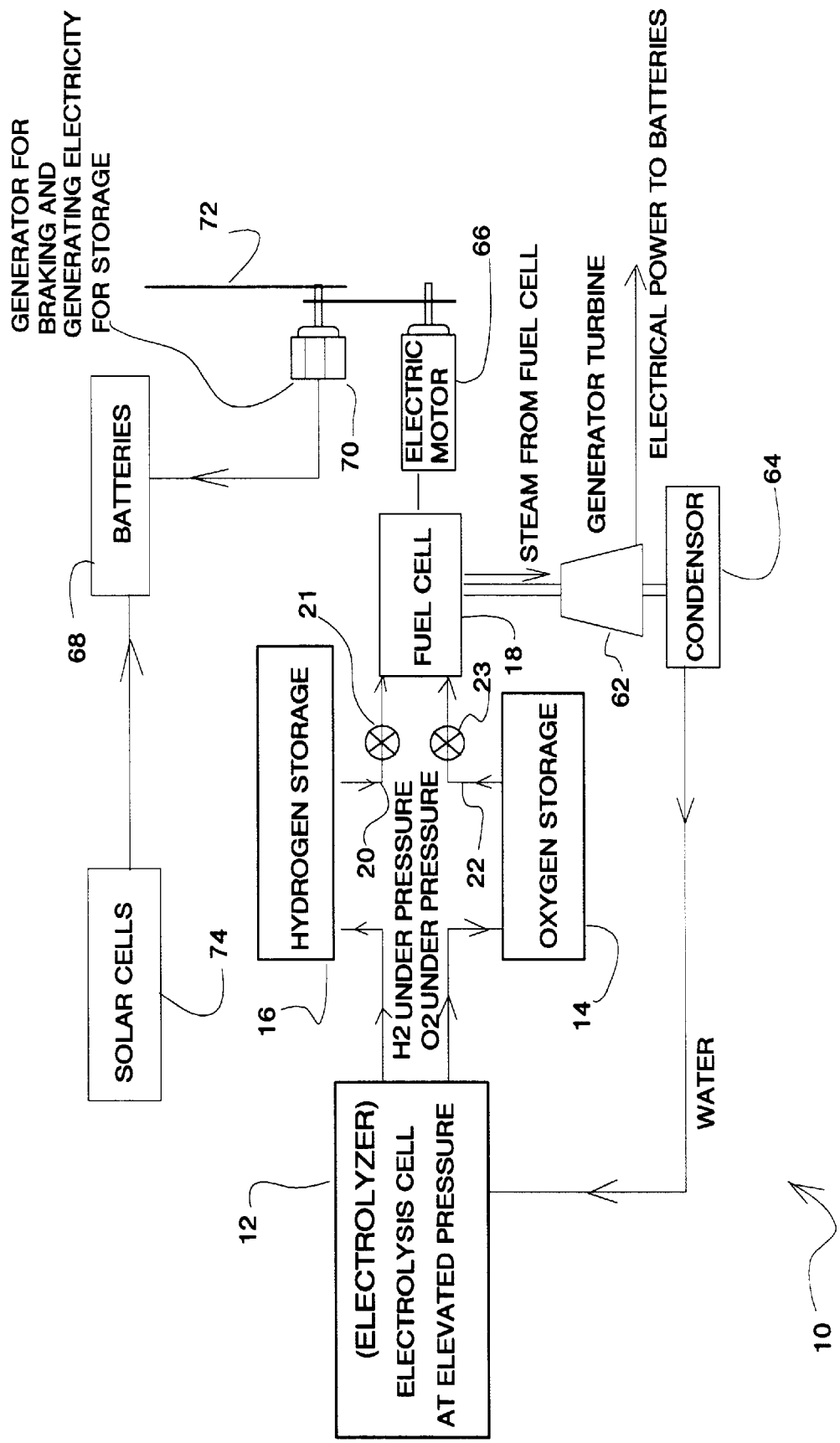
FIG. 1 is a schematic diagram illustrating a contemplated embodiment of the system.

Turning now to FIG. 1, where a multi-source electrical drive system 10 including components taught herein has been illustrated. As shown on FIG. 1, the multi-source electrical drive system 10 includes an electrolysis cell 12 which is used to separate water into its component elements, hydrogen and oxygen. The electrolysis cell delivers the oxygen to a means for storing the oxygen 14 and the hydrogen to a means for storing the hydrogen 16. The electrolysis cell 12 operates at elevated pressures due to the fact that the separation of the component elements of water in their gaseous states results in a fluid that will occupy larger volume than, say, water in a liquid state.

The products of the electrolysis cell 12 are stored in the means for storing the oxygen 14 and the means for storing the hydrogen 16, which may be storage tanks that retain the hydrogen and oxygen at the operating pressure of the electrolysis cell 12. An important advantage of operating the system at an elevated pressure is that by pressurizing the electrolysis cell 12, one eliminated the need for a pump between the electrolysis cell 12 and the hydrogen storage tank 16 and the oxygen storage tank 14. Additionally, the elevated pressure in the electrolysis cell 12 reduces the size of gas bubbles produced through the electrolytic reaction. The reduction in the size of the gas bubbles maintains a large wetted surface within the electrolysis cell 12 and thus reduces the amount of current needed for maintaining the electrolysis process.

From the means for storing the oxygen 14 and the means for storing the hydrogen 16 the hydrogen and oxygen are delivered through means for lowering the pressure of these gases, such as a valve, to a fuel cell 18. In the fuel cell 18 the hydrogen serves as a fuel gas 20 and the oxygen functions as an oxidant 22. To carry out the functions of the fuel cell 18, components of the fuel gas 20 and the oxidant 22 must be allowed to react with an electrolyte 24 that is in contact with at least two electrodes, one a cathode 26 and the other an anode 28.

Also shown on FIG. 1 is a pair of throttle valves 21 and 23, which are used to control the delivery of hydrogen or oxygen from the hydrogen storage 16 and oxygen storage 14 to the fuel cell 18. By opening the throttle valves 21 and 23 one produces a drop in pressure in the pressure in the hydrogen storage means 16 and the oxygen storage means 14. The drop in pressure in the hydrogen storage means 16 and the oxygen storage means 14 allows water to enter the electrolysis cell 12 which avails the electrolysis cell with water to allow further separation of the water into hydrogen and oxygen.

Figure 6:
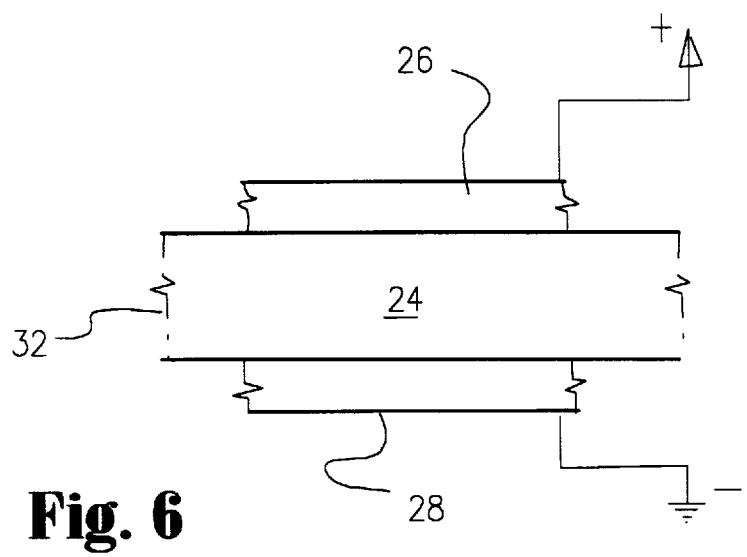
FIG. 6 illustrates a cross section of a membrane electrode assembly used with the instant invention.

To provide a lightweight electrode and electrolyte assembly, a membrane electrode assembly 30, which has been illustrated in FIG. 6, is used with the instant invention. The membrane electrode assembly 30 includes a sheet section of static electrolyte 32 that is coated on at least two surfaces with a conductor, one conductor serving as the cathode 26 and the other conductor serving as the anode 28.

Figure 2:
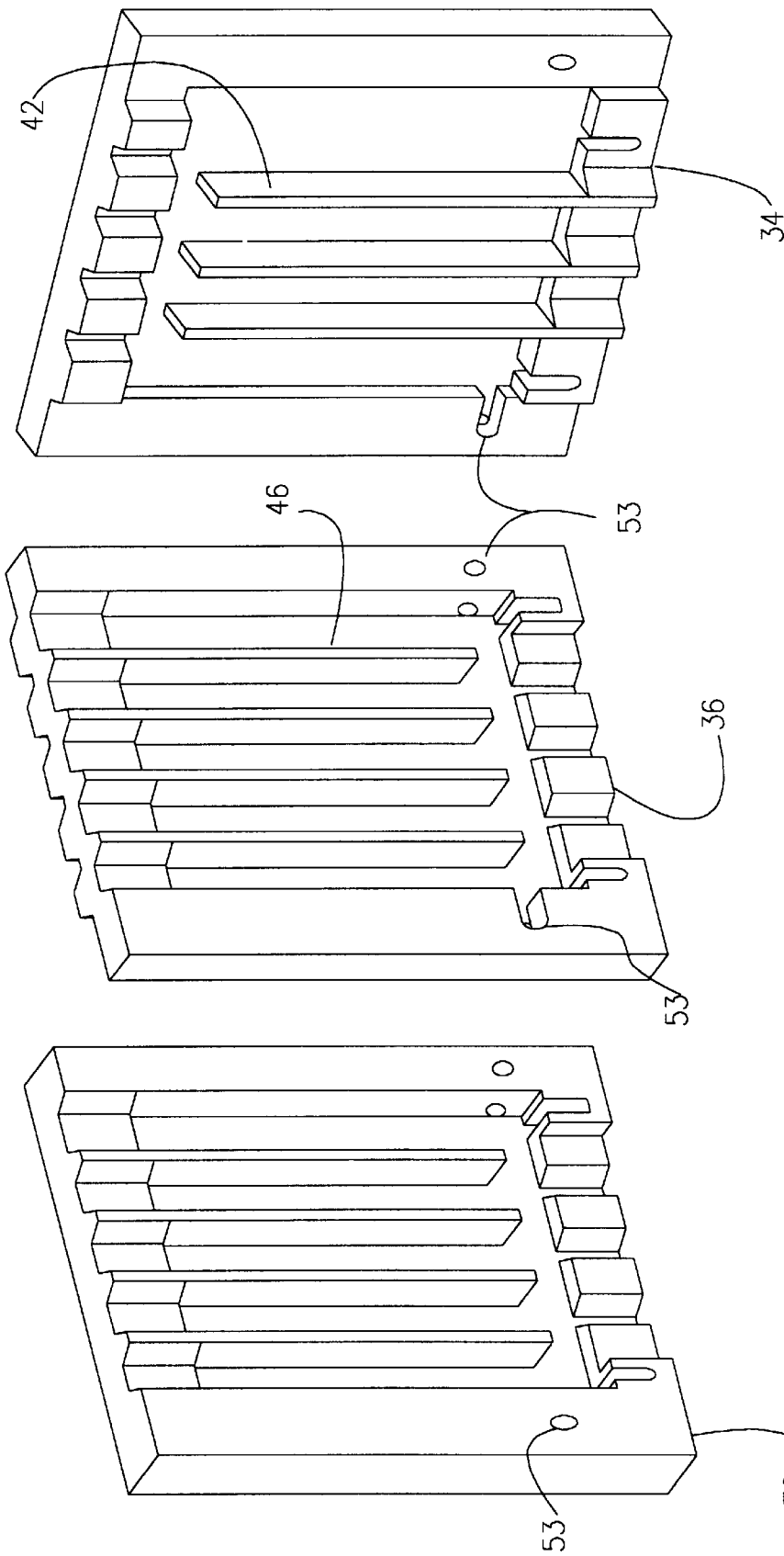
FIG. 2 is an exploded, perspective view of an embodiment of the plates used to form the fuel cell stack of the instant invention.

Referring now to FIG. 2 where several other important components of the fuel cell assembly components have been illustrated. As shown on FIG. 2 in a highly preferred embodiment of the invention a base plate 34 is used in combination with a bipolar plate 36 to form a first fuel cell 18 of a fuel cell stack 38.

Figure 3:
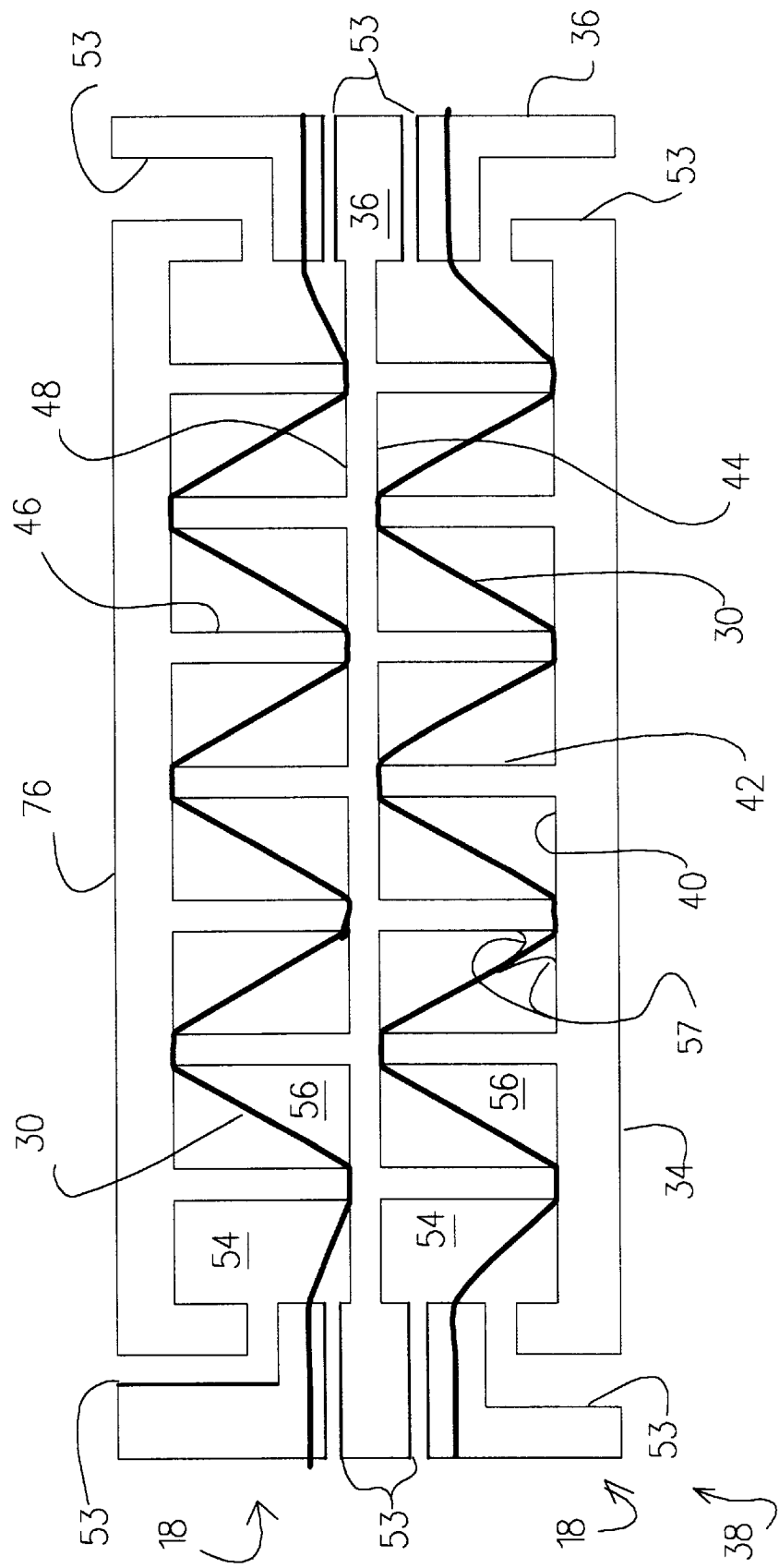
FIG. 3 illustrates the assembly of a fuel cell stack using components taught herein.

As shown on FIGS. 2 and 3 the base plate 34 includes a surface 40 that is contactable with the membrane electrode assembly 30. In a highly preferred embodiment of the invention a plurality of ribs 42 protrude from the surface that is contactable with the membrane electrode assembly 30.

The bipolar plate includes a first surface 44 that is contactable with an electrode and a plurality of ribs 46 that project from the first surface 44 and are spaced apart in a manner that allows the ribs on the first surface 44 of the bipolar plate 36 to nest between the ribs 42 on the surface 40 of the base plate 34, so that the ribs 46 on the first surface 44 of the bipolar plate 36 rest between the ribs 42 on the base plate 34 in a spaced apart relationship to the ribs 42 of the base plate 34.

It is important to note that the base plate 34 may be formed from a bipolar plate 36. In other words, a bipolar plate 36 may be used as an equivalent to the base plate 34. However, the preferred embodiment incorporates a base plate 34 in order to provide a plate that does not include manifolding passages that must be sealed off in order to allow the system to function.

In a highly preferred embodiment the bipolar plate 36 also includes a second surface 48 which includes a plurality of ribs 50 that are arranged in a substantially similar arrangement to the ribs 42 on the base plate 34, so that a second bipolar plate 36 may be mounted over the bipolar plate 36 that has been mounted over the base plate 34. Thus the ribs 46 on the first surface 44 of the second bipolar plate 36 will nest between the ribs 50 of the second surface 48 of the bipolar plate 36 that has been mounted over the base plate 34, and in substantially the same manner as the ribs 46 on the first surface of the bipolar plate 36 nest between the ribs 42 of the base plate 34.

Thus the disclosed plate arrangement allows the stacking of a series of bipolar plates 36 over one another to form a desired stack of fuel cells 18. Each fuel cell 18 will take advantage of a plate used to form the preceding fuel cell as a common separator wall. In a highly preferred embodiment of the invention all plates are made from a suitable carbon fiber and resin composite, which will preferably include surfaces that have been coated with a strong dielectric, such as a generous layer of resin which has been catalyzed for preventing the crossover of hydrogen.

Figure 4:
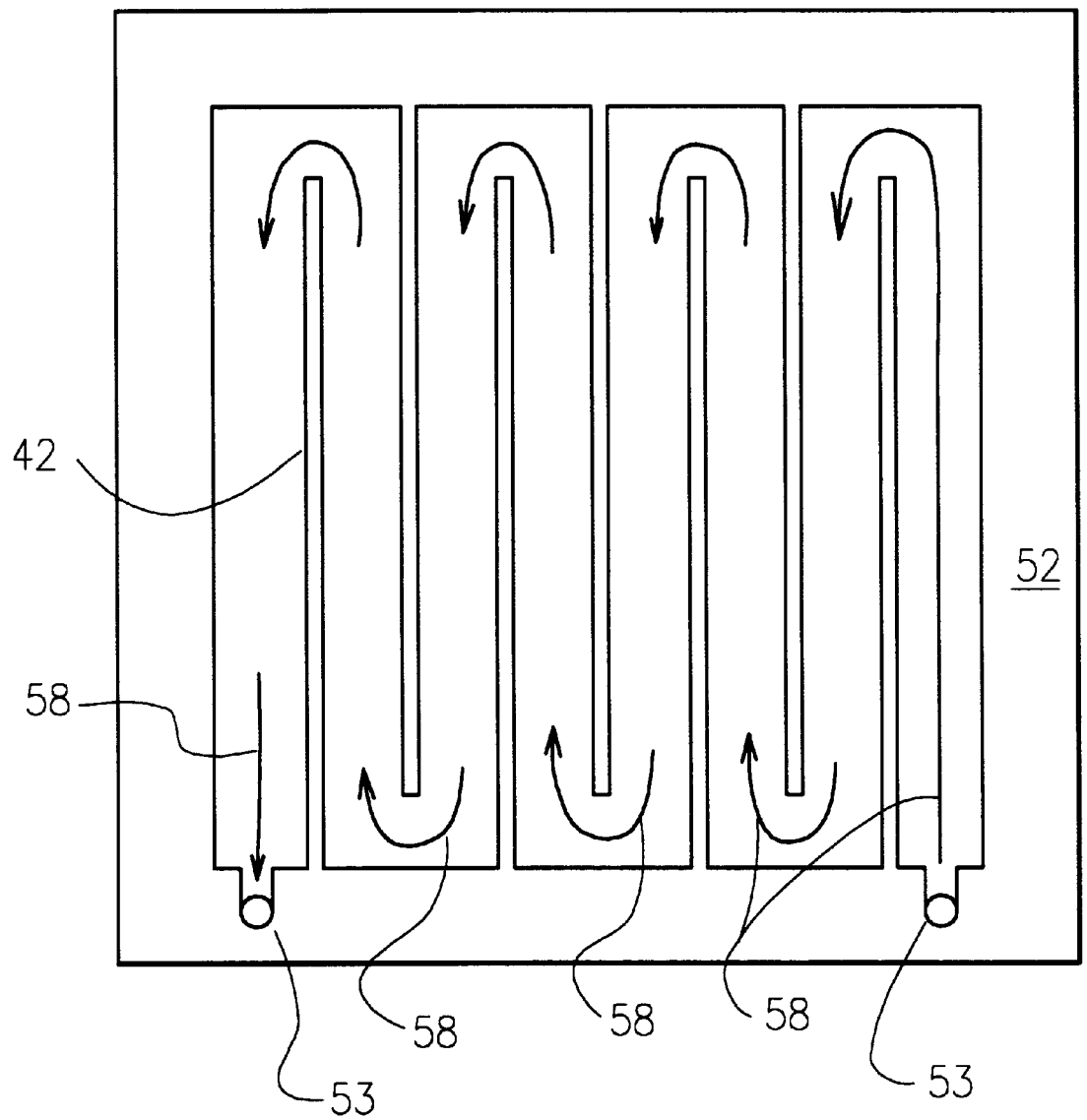
FIG. 4 is a plan view schematic illustrating the flow of gases through a fuel cell.
Figure 5:
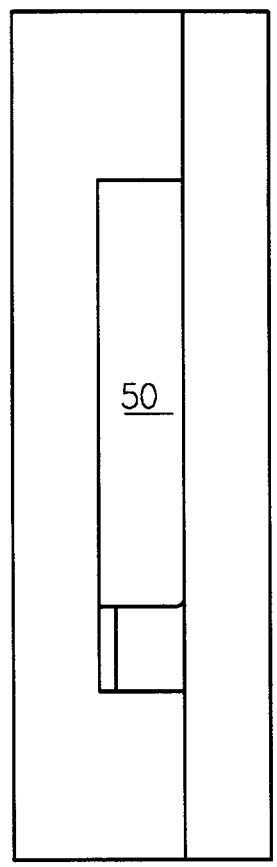
FIG. 5 is a side sectional view taken from FIG. 3 as indicated.

Incorporated into each bipolar plate 36 will be a raised perimeter 52 that will include manifolding passages 53 for allowing the introduction of reactant gases, such as fuel or oxidant, where desired. Referring to FIGS. 3 and 4 it will be understood that the membrane electrode assembly 30 will act as a divider between two consecutive plates to define a pair of continuous chambers between the plates. Thus as shown on FIG. 3 the membrane electrode assembly 30 separates the areas between the ribs 42 and 46 and the surface 40 on the base plate 34 and the first surface 44 on the bipolar plate 36 into a first reactant chamber 54 and a second reactant chamber 56.

It can be appreciated from FIG. 3 that the stacked arrangement produces allows the increase of the fuel cell effective area. Moreover, the rib arrangement produces a corrugated membrane electrode assembly 30 that provides a large electrically active area. Still further, also shown on FIG. 3 is that the angle produced between the ribs 42 and 46 and the membrane electrode assembly 30 allows water 57 produced within the stackup to drain towards the intersection between the ribs and the membrane electrode assembly 30 where it is held and can be wicked away by capillary action.

As shown on FIG. 4, which illustrates the travel of a reactant gas as indicated by the arrows 58 that enters either of the reactant chambers, such as the first reactant chamber 54 or the second reactant chamber 56. Thus, the flow of oxidant and fuel gas may be established with manifolding that leads to the reactant chambers. Clearly, the manifolding may be designed to establish a countercurrent of gases, as well as substantially parallel flows.

Since the bipolar plate 36 includes a second surface 48 which has ribs 50 that are substantially similar to the rib arrangement on the surface of the base plate 34, the addition of a second bipolar plate 36 over the bipolar plate 36 that has been mounted over the base plate 34 will also allow the placement of a section of a membrane electrode assembly 30 between the two bipolar plates to define another fuel cell with a first reactant chamber 54 and a second reactant chamber 56. As can be understood from FIG. 2, a stack of fuel cells formed from a series of bipolar plates over a base plate may then be closed off by an end plate 60 which essentially mirrors the base plate and closes off any interconnecting manifolding channels.

Referring once again to FIG. 6 it will be understood that the cathode 26 as well as the anode 28 of a section of membrane electrode assembly 30 may also be connected to a succeeding section of membrane electrode assembly 30 to achieve a stepping or adding of the voltages and currents developed through each cell of the fuel cell assembly stackup.

Referring once again to FIG. 1, it will be understood that it is contemplated that the manifolding system of the above fuel cell system include a passage that allows the products of the combination of the reactants combined in the fuel cell through a turbine 62. Thus, in the preferred embodiment where hydrogen and oxygen are used to as the reactant gases, the product of the reaction through the fuel cell, namely steam, may be expanded through a turbine 62 and then collected in a condenser 64 before recirculating the water to the electrolysis cell 12.

Electric power generated through the fuel cell stacks will preferably be delivered to an electric motor 66 or a set of batteries 68 where the power generated may be stored. It should be noted that while the preferred embodiment is shown including batteries 68 for the storage of electrical energy, it is contemplated that other known storage devices such as capacitors may also be used for storage of electrical energy. Mechanical energy delivered by the motor 66 may be connected to a generator 70 which in turn is connected to a mechanical power output 72. The electrical output of the generator 70 will preferably be connected to the batteries 68 or other auxiliary equipment. This arrangement will provide a means for providing regenerative breaking that uses the mechanical output as a means for braking or stopping a device being driven by the mechanical power output 72, and the breaking energy drawn from the device connected to the system may thus be converted into electrical energy for storage in the batteries 68 or other storage device. In other words, the system will recapture kinetic energy and convert this kinetic energy into electrical energy to be stored in the batteries 68. Also shown on FIG. 1 is that a preferred embodiment of the system 10 will also include solar cells 74 to aid in the charging of the batteries 68 during long periods of non-use.

Thus it can be appreciated that the above described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood by that the foregoing and other modifications are exemplary only, and that equivalent changes in form and detail may be made without departing from the true spirit and scope of the invention as claimed, except as precluded by the prior art.

What is claimed is:

1. A fuel cell system comprising:
    a membrane electrode assembly comprising:
        a corrugated conductive cathode sheet;
        a corrugated conductive anode sheet; and
        a corrugated sheet of electrolyte held between said conductive cathode sheet and said conductive anode sheet;
    a base plate having:
        a surface having a plurality of ribs;
        a bipolar plate having a first surface and a plurality of ribs projecting from the first surface, the ribs on the first surface of the bipolar plate being are spaced apart in a manner that allows the ribs on the first surface of the bipolar plate to nest between the ribs on the surface of the base plate, so that the membrane electrode assembly may be held against the surface of the base plate by the ribs on the first surface of the bipolar plate while the membrane electrode assembly is held against the first surface of the bipolar plate by the ribs of the base plate, so that a first reactant chamber is formed between the membrane electrode assembly and the surface of the base plate and a second reactant chamber is formed between the membrane electrode assembly and the first surface of said bipolar plate.

2. A fuel cell system according to claim 1 wherein said bipolar plate further comprises:
    a second surface having a plurality of ribs, the ribs on the second surface of the bipolar plate being positioned along the bipolar plate at a position between the ribs on the first surface of the bipolar plate.

3. A fuel cell system according to claim 2 wherein said membrane electrode assembly comprises:
    said cathode sheet of a pliable material;
    said anode sheet of a pliable material; and
    said sheet of electrolyte held between said conductive cathode sheet and said conductive anode sheet is of a pliable material.

4. A fuel cell system according to claim 3 wherein said membrane electrode assembly is held between the ribs of said base plate and the ribs of said bipolar plate in a generally corrugated shape by the ribs of said base plate and the ribs of said bipolar slate.

5. A fuel cell system according to claim 2 wherein said first reactant chamber and said second reactant chamber are substantially parallel to one another.

6. A fuel cell system comprising:
    a membrane electrode assembly comprising:
        a pliable conductive cathode sheet;
        a pliable conductive anode sheet; and
        a pliable sheet of electrolyte held between said pliable conductive cathode sheet and said pliable conductive anode sheet;
    at least two of a bipolar plate having:
        a first surface and a plurality of ribs projecting from the first surface, and a second surface having a plurality of ribs projecting from said second surface, the ribs projecting from said second surface being positioned along the second surface of said bipolar plate at a position on the second surface that lies between the ribs on the first surface of the bipolar plate, so that the ribs on the first surface of the bipolar plate may nest between the ribs on the second surface of another bipolar plate, so that the membrane electrode assembly may be held against the first surface of the surface of the bipolar plate by the ribs on the second surface of another bipolar plate while the membrane electrode assembly is held against the second surface of the bipolar plate by the ribs on the first surface of the bipolar plate, so that a first reactant chamber is formed between the membrane electrode assembly and the first surface of the base plate and a second reactant chamber is formed between the membrane electrode assembly and the second surface of another bipolar plate.

7. A fuel cell system according to claim 6 wherein said membrane electrode assembly is held between the ribs of one bipolar plate and the ribs of another bipolar plate in a generally corrugated shape.

8. A fuel cell system according to claim 7 wherein said first reactant chamber and said second reactant chamber are substantially parallel to one another.

* * * * *